(12) United States Patent
Yang et al.

(10) Patent No.: US 12,062,974 B2
(45) Date of Patent: Aug. 13, 2024

(54) FLYBACK POWER CONVERTER AND SWITCHED CAPACITOR CONVERTER CIRCUIT CAPABLE OF STEP-UP AND STEP-DOWN CONVERSION THEREOF

(71) Applicant: Richtek Technology Corporation, Zhubei (TW)

(72) Inventors: Ta-Yung Yang, Taoyuan (TW); Yu-Chang Chen, Nantou (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 293 days.

(21) Appl. No.: 17/716,933

(22) Filed: Apr. 8, 2022

(65) Prior Publication Data

US 2022/0329151 A1 Oct. 13, 2022

Related U.S. Application Data

(60) Provisional application No. 63/172,740, filed on Apr. 9, 2021.

(30) Foreign Application Priority Data

Jul. 29, 2021 (TW) ................. 110127946

(51) Int. Cl.
*H02M 1/00* (2007.01)
*H02M 3/07* (2006.01)
*H02M 3/335* (2006.01)

(52) U.S. Cl.
CPC ........... *H02M 1/0006* (2021.05); *H02M 3/07* (2013.01); *H02M 3/33523* (2013.01)

(58) Field of Classification Search
CPC ........ H02M 1/0006; H02M 1/36; H02M 3/07; H02M 3/072; H02M 3/073; H02M 3/075; H02M 3/076; H02M 1/0095
See application file for complete search history.

(56) References Cited

U.S. PATENT DOCUMENTS

| | | | | |
|---|---|---|---|---|
| 6,438,005 B1* | 8/2002 | Walter | ..................... | H02M 3/07 363/60 |
| 6,559,689 B1* | 5/2003 | Clark | .................... | H03K 17/063 327/91 |
| 8,222,872 B1* | 7/2012 | Melanson | ............. | H02M 3/155 363/61 |
| 10,075,080 B1* | 9/2018 | Scoones | ................ | H02M 3/158 |

(Continued)

*Primary Examiner* — Gustavo A Rosario-Benitez
(74) *Attorney, Agent, or Firm* — Tung & Associates

(57) ABSTRACT

A switched capacitor converter circuit includes: a conversion capacitor; an output capacitor; and switches configured to switch the coupling configurations of the conversion capacitor and the output capacitor according to a level of the first power supply voltage of the switched capacitor converter circuit, to generate the second power supply voltage at the output capacitor according to the first power supply voltage. The second power supply voltage provides power to control the power converter circuit. When the first power supply voltage is higher than a high threshold, the switched capacitor converter circuit controls the second power supply voltage to be lower than the first power supply voltage. When the first power supply voltage is lower than a low threshold, the switched capacitor converter circuit controls the second power supply voltage to be higher than the first power supply voltage.

23 Claims, 5 Drawing Sheets

(56) References Cited

U.S. PATENT DOCUMENTS

| | | | |
|---|---|---|---|
| 2007/0210774 A1* | 9/2007 | Kimura | H02M 1/36 363/59 |
| 2010/0073082 A1* | 3/2010 | Takeshita | H03K 17/567 327/581 |
| 2011/0157919 A1* | 6/2011 | Yedevelly | H02M 3/33507 363/20 |
| 2012/0249224 A1* | 10/2012 | Wei | H02M 3/07 327/536 |
| 2015/0062972 A1* | 3/2015 | Yang | H02M 3/33592 363/21.01 |
| 2015/0303807 A1* | 10/2015 | Garvey | H02M 3/07 323/271 |
| 2018/0309362 A1* | 10/2018 | Raimar | H02M 3/073 |
| 2019/0348917 A1* | 11/2019 | Lee | G05F 1/56 |
| 2020/0366194 A1* | 11/2020 | Tsai | H02M 3/158 |
| 2021/0083572 A1* | 3/2021 | Yen | H02J 7/06 |
| 2023/0344355 A1* | 10/2023 | Poon | H02M 1/0035 |

* cited by examiner

FLYBACK POWER CONVERTER AND SWITCHED CAPACITOR CONVERTER CIRCUIT CAPABLE OF STEP-UP AND STEP-DOWN CONVERSION THEREOF

CROSS REFERENCE

The present invention claims priority to U.S. 63/172,740 filed on Apr. 9, 2021 and claims priority to TW 110127946 filed on Jul. 29, 2021.

BACKGROUND OF THE INVENTION

Field of Invention

The present invention relates to a switched capacitor converter circuit; particularly, it relates to such switched capacitor converter circuit and a flyback power converter comprising such switched capacitor converter circuit which are capable of adjusting a level of an output voltage according to a level of an input voltage.

Description of Related Art

Please refer to FIG. 1, which shows a schematic diagram of a conventional flyback power converter 100. An auxiliary winding NA of a transformer 10 generates an auxiliary voltage VNA via a diode 40 and a capacitor 45. The auxiliary voltage VNA provides power to a primary side control circuit 50, so that the primary side control circuit 50 can control the flyback power converter 100. There is a ratio relationship between the auxiliary voltage VNA and the output voltage Vout, wherein the ratio relationship between the auxiliary voltage VNA and the output voltage Vout is proportional to a turn ratio of the auxiliary winding NA to a secondary winding NS. A secondary side control circuit 60 has interface terminals CC1 and CC2, wherein the interface terminals CC1 and CC2 receive instructions from a communication interface (e.g., USB PD), so as to program the voltage level of the output voltage Vout. In recent development, it is required to program the output voltage Vout to a voltage level ranging from 3.2V to 48V, to cover multiple different applications ranging from charging a cell phone to charging a battery of a portable electromotive tool. The prior art shown in FIG. 1 has the following drawback that: when the range of the voltage level of the output voltage Vout is too broad, the range of the voltage level of the auxiliary voltage VNA will also become too broad. Under such situation, the primary side control circuit 50 and the secondary side control circuit 60 need to operate in very broad voltage range, which undesirably results in poor efficiency. The present invention overcomes the above-mentioned drawback by providing a high efficiency power supply circuit to the primary side control circuit and/or the secondary side control circuit.

In view of the above, to overcome the drawback in the prior art, the present invention proposes an innovative switched capacitor converter circuit and a power converter circuit therein.

SUMMARY OF THE INVENTION

From one perspective, the present invention provides a switched capacitor converter circuit, which is configured to operably convert a first power supply voltage to a second power supply voltage, wherein the second power supply voltage is provided to a power converter circuit; the switched capacitor converter circuit comprising: a conversion capacitor; an output capacitor; and a plurality of switches, which are configured to operably switch the coupling configurations of the conversion capacitor and the output capacitor according to a level of the first power supply voltage of the switched capacitor converter circuit, so as to generate the second power supply voltage at the output capacitor according to the first power supply voltage; wherein the second power supply voltage is configured to operably control the power converter circuit by providing power to the power converter circuit; wherein when the first power supply voltage is higher than a high threshold, the switched capacitor converter circuit controls the second power supply voltage to be lower than the first power supply voltage; and wherein when the first power supply voltage is lower than a low threshold, the switched capacitor converter circuit controls the second power supply voltage to be higher than the first power supply voltage.

From another perspective, the present invention provides a flyback power converter, comprising: a controller, which is configured to operably control a first winding of a transformer, so as to convert an input voltage to an output voltage at a second winding of the transformer; and a switched capacitor converter circuit, which is configured to operably convert a first power supply voltage to a second power supply voltage, wherein the second power supply voltage is provided to the controller, wherein the first power supply voltage is coupled to the first winding of the transformer of the transformer; wherein the switched capacitor converter circuit includes: a conversion capacitor; an output capacitor; and a plurality of switches, which are configured to operably switch the coupling configurations of the conversion capacitor and the output capacitor according to a level of the first power supply voltage of the switched capacitor converter circuit, so as to generate the second power supply voltage at the output capacitor according to the first power supply voltage; wherein the second power supply voltage is configured to operably control the power converter circuit by providing power to the power converter circuit; wherein when the first power supply voltage is higher than a high threshold, the switched capacitor converter circuit controls the second power supply voltage to be lower than the first power supply voltage; and wherein when the first power supply voltage is lower than a low threshold, the switched capacitor converter circuit controls the second power supply voltage to be higher than the first power supply voltage.

In one embodiment, when the first power supply voltage is lower than the high threshold and higher than the low threshold, the switched capacitor converter circuit controls the second power supply voltage to be equal to the first power supply voltage.

In one embodiment, the power converter circuit is a flyback power converter.

In one embodiment, the second power supply voltage is provided to a controller of the flyback power converter.

In one embodiment, the first power supply voltage is coupled from a winding of a transformer of the flyback power converter.

In one embodiment, the first power supply voltage is proportional to an output voltage of the flyback power converter.

In one embodiment, the second power supply voltage is lower than an absolute maximum rating of the controller, wherein the absolute maximum rating is smaller than a maximum level of the first power supply voltage.

In one embodiment, when the first power supply voltage is higher than the high threshold, the second power supply voltage is controlled to be ½-fold of the first power supply voltage.

In one embodiment, the high threshold is greater than or equal to 2-fold of a minimum operation voltage of a controller of the power converter circuit.

In one embodiment, when the first power supply voltage is lower than the low threshold, the second power supply voltage is controlled to be 2-fold of the first power supply voltage.

In one embodiment, the low threshold is greater than or equal to a minimum operation voltage of a controller of the power converter circuit.

In one embodiment, the plurality of switches periodically switch according to a switching period to execute at least one of the following operations: (1) when the first power supply voltage is higher than the high threshold, during a first period of the switching period, the plurality of switches control the conversion capacitor and the output capacitor to be electrically connected in series between the first power supply voltage and a ground level, and when the first power supply voltage is higher than the high threshold, during a second period of the switching period, the plurality of switches control the conversion capacitor and the output capacitor to be electrically connected in parallel to each other, thereby generating the second power supply voltage at the output capacitor, so that the second power supply voltage is controlled to be ½-fold of the first power supply voltage; and/or (2) when the first power supply voltage is lower than the low threshold, during the first period of the switching period, the plurality of switches control the conversion capacitor to be electrically connected in parallel to the first power supply voltage, so that the conversion capacitor is charged, and when the first power supply voltage is lower than the low threshold, during the second period of the switching period, the plurality of switches control the conversion capacitor and the output capacitor to be electrically reversely connected in series to each other between the first power supply voltage and the ground level, thereby generating the second power supply voltage at the output capacitor, so that the second power supply voltage is controlled to be 2-fold of the level of the first power supply voltage.

In one embodiment, a dead time is provided between the first period of the switching period and the second period of the switching period, so as to prevent a part of the plurality of switches from being ON at the same time, thereby preventing a short circuit current from occurring.

In one embodiment, the switched capacitor converter circuit includes: a first switch, a second switch, a third switch, a fourth switch and a fifth switch, wherein the first to four switches are coupled sequentially in series between the first power supply voltage and the ground level, wherein the first switch and the second switch are coupled to a first node; the second switch and the third switch are coupled to a second node; the third switch and the fourth switch are coupled to a third node, wherein the fifth switch is coupled between the first power supply voltage and the third node, wherein the second node is coupled to the second power supply voltage; wherein the conversion capacitor is coupled between the first node and the third node, whereas, the output capacitor is coupled between the second power supply voltage and the ground level.

In one embodiment, when the first power supply voltage is lower than the high threshold and when the first power supply voltage is higher than the low threshold, the first switch and the second switch are ON and/or the third switch and the fifth switch are ON, thereby controlling the first power supply voltage and the second power supply voltage to be electrically connected to each other, so that the second power supply voltage is equal to the first power supply voltage.

In one embodiment, each of the first switch and the second switch includes: a first transistor and a second transistor, which are connected in series to each other, wherein a body diode of the first transistor and a body diode of the second transistor are reversely coupled to each other.

Advantages of the present invention include: that the required withstand voltages of the primary side control circuit and the secondary side control circuit are reduced; that power consumption is reduced; and that the power efficiencies of the primary side control circuit and the secondary side control circuit are enhanced.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
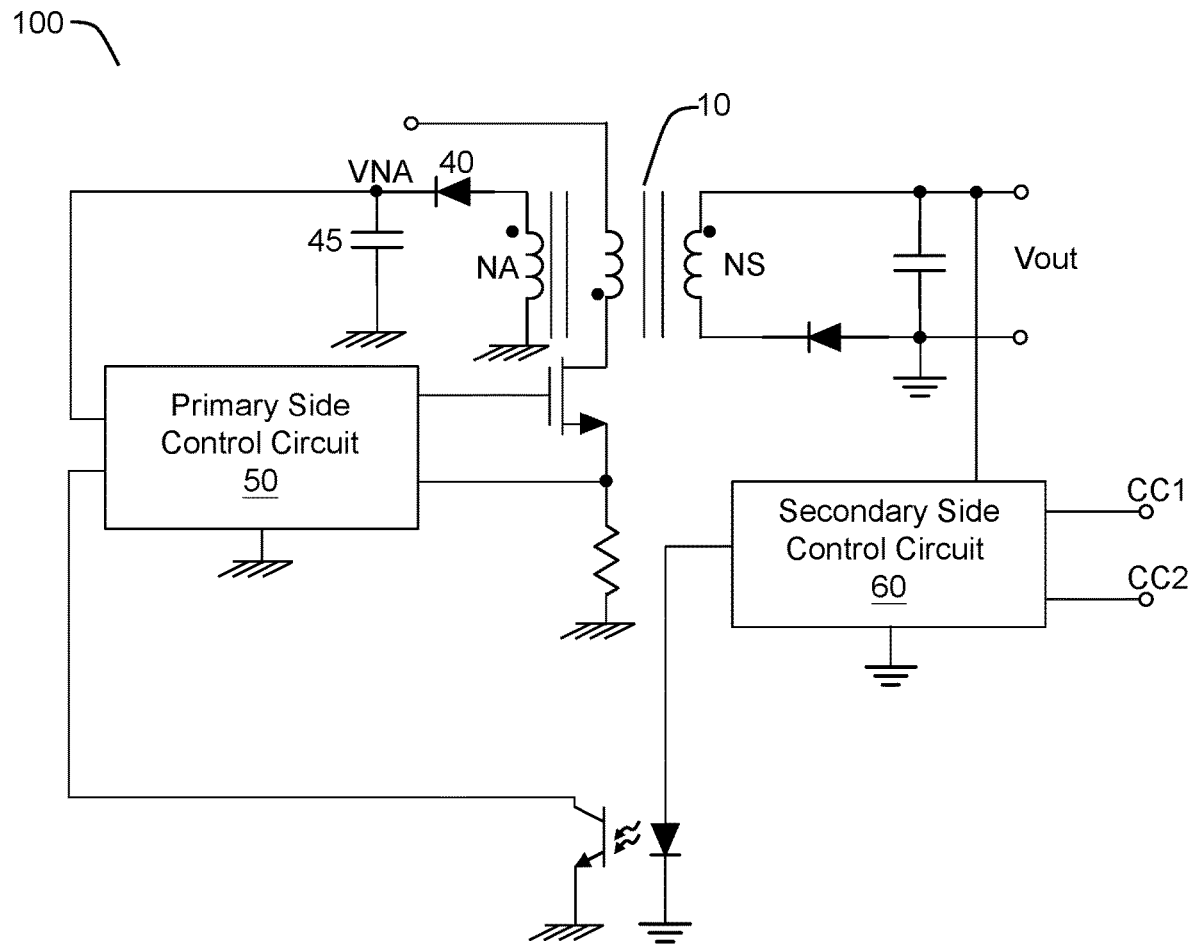
FIG. 1 shows a schematic diagram of a conventional flyback power converter.
Figure 2:
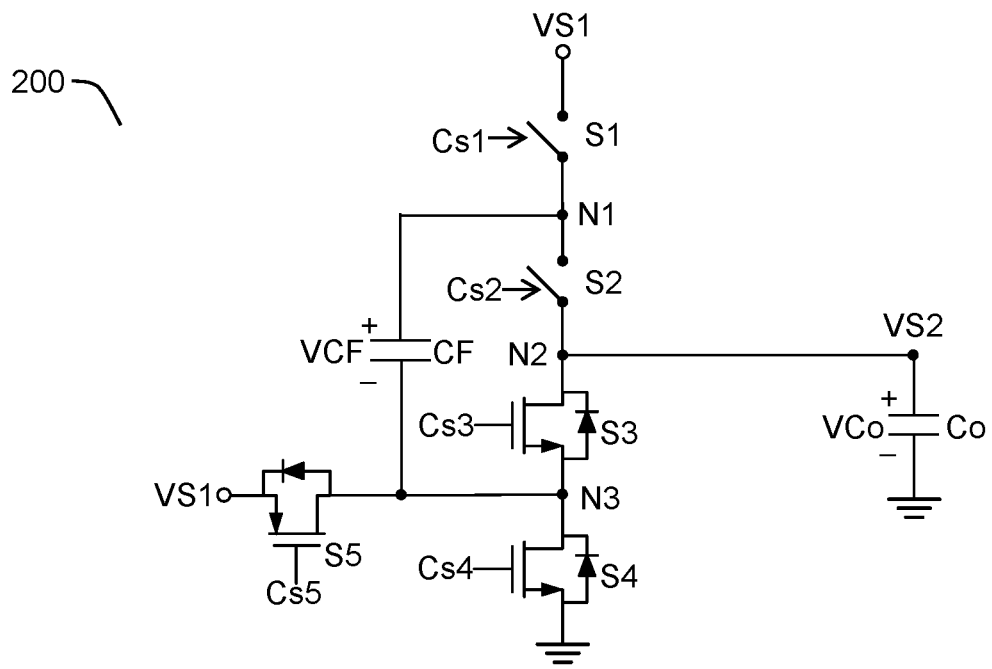
FIG. 2 shows a schematic diagram of a switched capacitor converter circuit according to an embodiment of the present invention.
Figure 2:

Please refer to FIG. 2, which shows a schematic diagram of a switched capacitor converter circuit (i.e., switched capacitor converter circuit 200) according to an embodiment of the present invention. As shown in FIG. 2, the switched capacitor converter circuit 200 of the present invention is configured to operably convert a first power supply voltage VS1 to a second power supply voltage VS2, and the second power supply voltage VS2 is provided to a power converter circuit. The switched capacitor converter circuit 200 comprises: a conversion capacitor CF, an output capacitor Co and switches S1~S5. The switches S1~S5 are configured to operably switch the coupling configurations of the conversion capacitor CF and the output capacitor Co according to a level of the first power supply voltage VS1 of the switched capacitor converter circuit 200, so as to generate the second power supply voltage VS2 at the output capacitor Co according to the first power supply voltage VS1. The second power supply voltage VS2 is configured to supply power to a controller of the power converter circuit so that the controller can control the power converter circuit to execute power conversion, the details of which will be described later. As shown in FIG. 2, the switched capacitor converter circuit 200 further includes a supply controller 201, which is configured to operably generate switch control signals Cs1~Cs5 according to the first power supply voltage VS1. The switches S1~S5 are configured to operably switch the coupling configurations of the conversion capacitor CF and the output capacitor Co according to switch control signals Cs1~Cs5, respectively.

In one embodiment, when the first power supply voltage VS1 is higher than a high threshold, the switched capacitor converter circuit 200 controls the second power supply voltage VS2 to be lower than the first power supply voltage VS1; for example, the second power supply voltage VS2 can be, but not limited to, ½-fold of the level of the first power supply voltage VS1. In one embodiment, when the first power supply voltage VS1 is lower than a low threshold, the switched capacitor converter circuit 200 controls the second power supply voltage VS2 to be higher than the first power supply voltage VS1; for example, the second power supply voltage VS2 can be, but not limited to, 2-fold of the level of the first power supply voltage VS1. In one embodiment, when the first power supply voltage VS1 is lower than the high threshold and higher than the low threshold, the switched capacitor converter circuit 200 controls the second power supply voltage VS2 to be equal to the first power supply voltage VS1.

As shown in FIG. 2, in one embodiment, the switched capacitor converter circuit 200 includes: switches S1-S5 and a conversion capacitor CF. The first switch S1, the second switch S2, the third switch S3, the fourth switch S4 are sequentially coupled in series between the first power supply voltage VS1 and the ground level, wherein the first switch S1 and the second switch S2 are coupled to a first node N1 in between, the second switch S2 and the third switch S3 are coupled to a second node N2 in between, and the third switch S3 and the fourth switch S4 are coupled to a third node N3 in between. The fifth switch S5 is coupled between the first power supply voltage VS1 and the third node N3. The second node N2 is coupled to the second power supply voltage VS2. The conversion capacitor CF is coupled between the first node N1 and the third node N3. An output capacitor Co is coupled between the second power supply voltage VS2 and the ground level.

Figure 4:
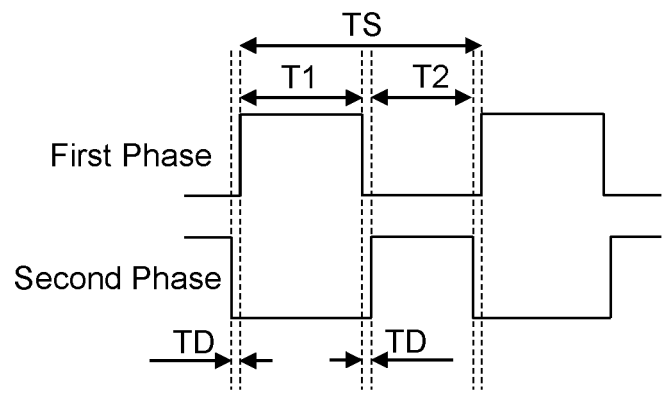
FIG. 4 illustrates waveform diagrams depicting the operations of switches of a switched capacitor converter circuit according to an embodiment of the present invention.

Please refer to FIG. 2 in conjugation with FIG. 4. FIG. 4 illustrates waveform diagrams depicting the operations of the switches of the switched capacitor converter circuit according to one embodiment of the present invention. The switches S1~S5 switch periodically according to a switching period TS. In one embodiment, when the first power supply voltage VS1 is higher than the high threshold, during a first period T1 of the switching period TS, the switches S1 and S3 are ON to control the conversion capacitor CF and the output capacitor Co to be electrically connected in series between the first power supply voltage VS1 and a ground level, and during a second period T2 of the switching period TS, the switches S2 and S4 are ON to control the conversion capacitor CF and the output capacitor Co to be electrically connected in parallel, thereby generating the second power supply voltage VS2 at the output capacitor Co. To be more specific, in this embodiment, the switches S2, S4 and S5 are OFF during the first period T1, whereas, the switches S1, S3 and S5 are OFF during the second period T2. Note that the switch S5 is always OFF. In other words, the switch control signal Cs1 of the switch S1 and the switch control signal Cs3 of the switch S3 operate as the waveform of the first phase as illustrated in FIG. 4, and the switch control signal Cs2 of the switch S2 and the switch control signal Cs4 of the switch S4 operate as the waveform of the second phase as illustrated in FIG. 4.

In another embodiment, when the first power supply voltage VS1 is lower than the low threshold, during the first period T1 of the switching period TS, the switches S1 and S4 control the conversion capacitor CF to be electrically connected in parallel to the first power supply voltage VS1, so that the conversion capacitor CF is charged, and during the second period T2 of the switching period TS, the switches S2 and S5 control the conversion capacitor CF and the output capacitor Co to be electrically reversely connected in series between the first power supply voltage VS1 and the ground level, thereby generating the second power supply voltage VS2 at the output capacitor Co. To elaborate in detail, in this embodiment, during the second period T2, the voltage VCo across the output capacitor Co is in-phase with the first power supply voltage VS1, whereas, the voltage VCF across the conversion capacitor CF is in reversed-phase with the voltage VCo across the output capacitor Co. In this embodiment, the switches S2, S3 and S5 are OFF during the first period T1, whereas, the switches S1, S3 and S4 are OFF during the second period T2. Note that the switch S3 is always OFF. In other words, the switch control signal Cs1 of the switch S1 and the switch control signal Cs4 of the switch S4 operate as the waveform of the first phase illustrated in FIG. 4, and, the switch control signal Cs2 of the switch S2 and the switch control signal Cs5 of the switch S5 operate as the waveform of the second phase illustrated in FIG. 4. Preferably, as shown in FIG. 4, a dead time TD is provided between the first period T1 of the switching period TS and the second period T2 of the switching period TS, to avoid short circuit current caused by some of the switches being ON at the same time.

In yet another embodiment, when the first power supply voltage VS1 is lower than the high threshold and higher than the low threshold, the first switch S1, the second switch S2 and the fourth switch S4 are ON, thereby controlling the first power supply voltage VS1 and the second power supply voltage VS2 to be electrically connected to each other, so that the second power supply voltage VS2 is equal to the first power supply voltage VS1. That is, the first power supply voltage VS1 serves as the second power supply voltage VS2. In this embodiment, the third switch S3 and the fifth switch S5 are OFF. Or, in another embodiment, the third switch S3 and the fifth switch S5 can be ON, so that the first power supply voltage VS1 and the second power supply voltage VS2 are electrically connected to each other.

Figure 3:
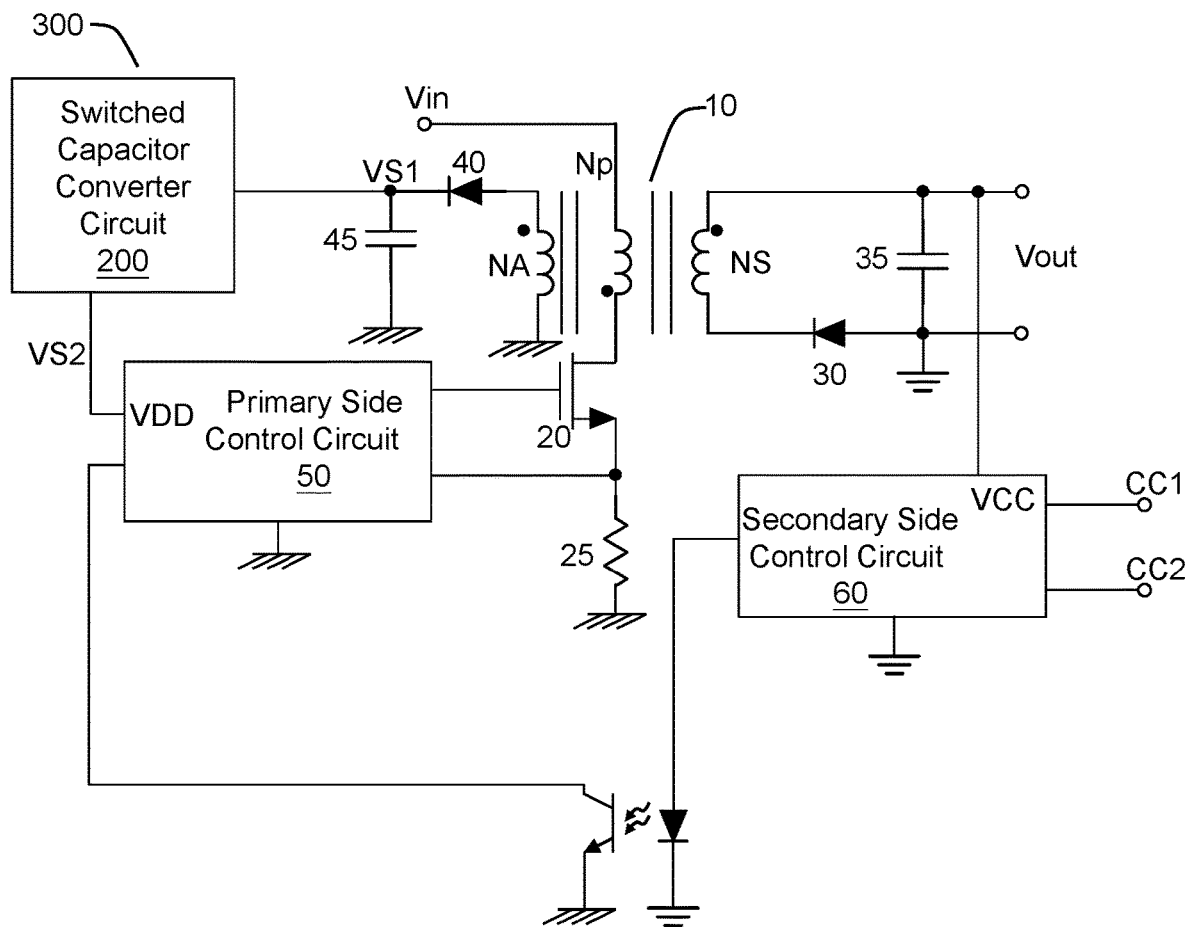
FIG. 3 shows a schematic diagram of a flyback power converter according to an embodiment of the present invention.

Please refer to FIG. 3, which shows a schematic diagram of a flyback power converter according to an embodiment of the present invention. This embodiment exemplifies how to apply the switched capacitor converter circuit 200 into a power converter circuit, such as a flyback power converter. As shown in FIG. 3, a flyback power converter 300 includes a transformer 10. A winding (e.g., an auxiliary winding NA) of the transformer 10 generates a first power supply voltage VS1 via for example a rectifier (for example formed by a diode 40 and a capacitor 45), so that the first power supply voltage VS1 provides power to the switched capacitor converter circuit 200. A secondary winding NS of the transformer 10 generates an output voltage Vout via for example a rectifier (for example formed by a diode 30 and a capacitor 35). A secondary side control circuit 60 generates a feedback signal according to the output voltage Vout and the feedback signal is delivered to a primary side control circuit 50 via for example a photocoupler. In other embodiments, the diode 30 in the rectifier in the above-mentioned preferred embodiment can be replaced by a switch.

The flyback power converter 300 further includes: a primary side switch 20. A gate of the primary side switch 20 is coupled to the primary side control circuit 50. A source of the primary side switch 20 is coupled to a ground level. A drain of the primary side switch 20 is coupled to a primary winding Np. The switched capacitor converter circuit 200 is configured to operably convert the first power supply voltage VS1 to a second power supply voltage VS2. The second power supply voltage VS2 is provided to the primary side control circuit 50 (corresponding to the above-mentioned controller), so as to control the primary side switch 20 of the flyback power converter 300 to perform power conversion. There is a ratio relationship between the first power supply voltage VS1 and an output voltage Vout; to be more specific, the ratio relationship between the first power supply voltage VS1 and the output voltage Vout is proportional to a turn ratio between the auxiliary winding NA and a secondary winding NS. In one embodiment, the first power supply voltage VS1 is proportional to the output voltage Vout. The secondary side control circuit 60 has interface terminals CC1 and CC2, for receiving instructions from a communication interface (e.g., USB PD), so as to program the voltage level of the output voltage Vout. In another embodiment, the second power supply voltage VS2 can be provided to the secondary side control circuit 60.

In one embodiment, the second power supply voltage VS2 is lower than an absolute maximum rating of the controller (e.g., the primary side control circuit 50) of the flyback power converter 300. And, the absolute maximum rating is smaller than a maximum level of the first power supply voltage VS1. In comparison to the prior art wherein the first power supply voltage VS1 is directly provided to the primary side control circuit 50, when the first power supply voltage VS1 is set to a maximum level and such maximum level exceeds the absolute maximum rating, the primary side control circuit 50 will be damaged. To avoid such problem, the present invention provides power to the primary side control circuit 50 by the second power supply voltage VS2 which is adaptively adjusted.

In one embodiment, the above-mentioned high threshold is greater than or equal to 2-fold of a minimum operation voltage of the flyback power converter 300, such as 2-fold of a minimum operation voltage of a controller (e.g., the primary side control circuit 50) of the flyback power converter 300. In another embodiment, the above-mentioned low threshold is greater than or equal to a minimum operation voltage of the flyback power converter 300, such as a minimum operation voltage of a controller (e.g., the primary side control circuit 50) of the flyback power converter 300. The above-mentioned boundary limits can ensure the second power supply voltage VS2 not to be lower than the minimum operation voltage of, e.g., the primary side control circuit 50, so that it is ensured that the primary side control circuit 50 can operate normally.

Figure 5:
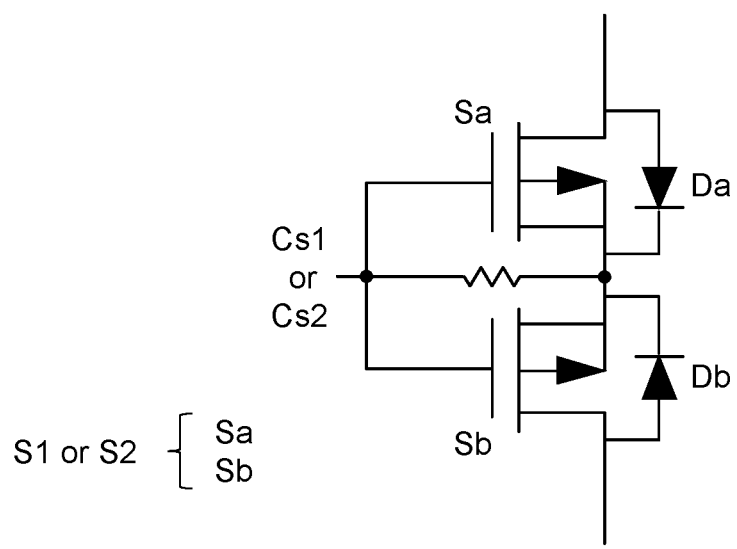
FIG. 5 shows a specific circuit diagram of a switch of a switched capacitor converter circuit according to an embodiment of the present invention.

Please refer to FIG. 5, which shows a circuit diagram of a specific embodiment of the switch S1 or S2 of a switched capacitor converter circuit according to the present invention. As shown in FIG. 5, each of the switch S1 and the switch S2 includes: a first transistor Sa and a second transistor Sb, which are connected in series to each other. A body diode Da of the first transistor Sa and a body diode Db of the second transistor Sb are reversely coupled to each other, so that when the switch control signals Cs1 and Cs2 control the switch S1 and the switch S2 to be OFF, there is no unwanted current flowing through the body diodes.

Figure 6:
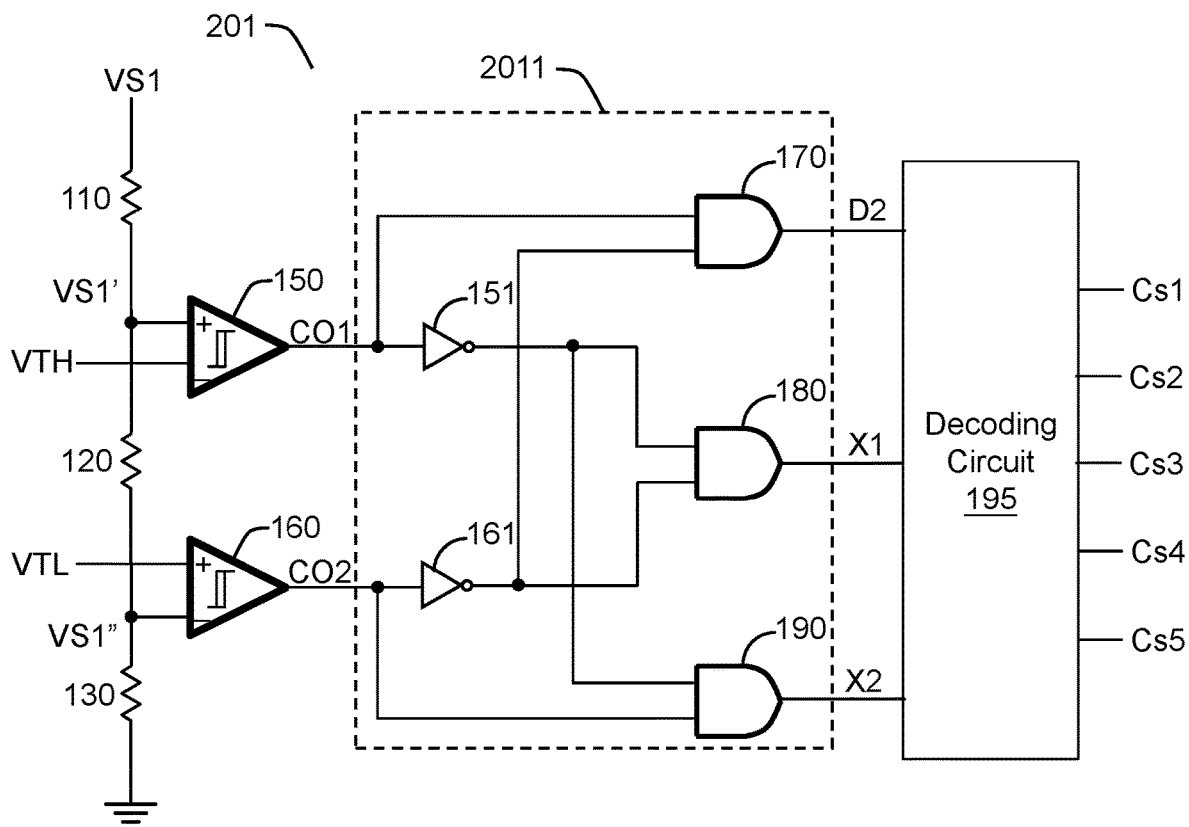
FIG. 6 shows a specific circuit diagram of a supply controller of a switched capacitor converter circuit according to an embodiment of the present invention.

Please refer to FIG. 6, which shows a circuit diagram of a specific embodiment of a supply controller of a switched capacitor converter circuit according to the present invention. This embodiment is an exemplary embodiment of the supply controller 201 shown in FIG. 2. As shown in FIG. 6, the supply controller 201 includes: a resistor 110, a resistor 120, a resistor 130, a comparator 150, a comparator 160, a mode determination circuit 2011 and a decoding circuit 195. The resistor 110, the resistor 120 and the resistor 130 constitute a voltage-divider, which is configured to divide the first power supply voltage VS1 to generate a proportion voltage VS1' and a proportion voltage VS1". The comparator 150 compares the proportion voltage VS1' with a high threshold related signal VTH, to generate an output signal CO1. The comparator 160 compares the proportion voltage VS1" with a low threshold related signal VTL, to generate an output signal CO2. In one embodiment, the high threshold related signal VTH is correlated with the high threshold, and, the low threshold related signal VTL is correlated with the low threshold.

In one embodiment, the mode determination circuit 2011 generates a signal D2, a signal X1, and a signal X2 according to the output signal CO1 of the comparator 150 and the output signal CO2 of the comparator 160. In one embodiment, the mode determination circuit 2011 includes inverters 151 and 161 and AND gates 170, 180 and 190. The signal D2 indicates whether the second power supply voltage VS2 is controlled to be ½-fold of the first power supply voltage VS1. The signal X2 indicates whether the second power supply voltage VS2 is controlled to be 2-fold of the first power supply voltage VS1. The signal X1 indicates whether the first power supply voltage VS1 serves as the second power supply voltage VS2. In one embodiment, the comparator 150 and the comparator 160 are hysteresis comparators. The decoding circuit 195 generates corresponding switch control signals Cs1~Cs5 in different modes according to the signals D2, X1, and X2.

When the proportion voltage VS1' is higher than the high threshold related signal VTH (indicating that the first power supply voltage VS1 is higher than the high threshold), the signal D2 is enabled and accordingly controls the switched capacitor converter circuit 200 to generate the second power supply voltage VS2 which is lower than the first power supply voltage VS1; the second power supply voltage VS2 can be, for example but not limited to, ½-fold of the first power supply voltage VS1. When the proportion voltage VS1" is lower than the low threshold related signal VTL (indicating that the first power supply voltage VS1 is lower than the low threshold), the signal X2 is enabled and accordingly controls the switched capacitor converter circuit 200 to generate the second power supply voltage VS2 which is higher than the first power supply voltage VS1; the second power supply voltage VS2 can be, for example but not limited to, 2-fold of the first power supply voltage VS1. When the proportion voltage VS1' is lower than the high threshold related signal VTH and the proportion voltage VS1" is higher than the low threshold related signal VTL (indicating that the voltage level of the first power supply voltage VS1 is between the high threshold and the low threshold), the signal X1 is enabled and accordingly controls the switched capacitor converter circuit 200 to generate the second power supply voltage VS2 having a level which is equal to the first power supply voltage VS1.

The present invention has provided a switched capacitor converter circuit and a power converter circuit therein as described above. Advantages of the present invention include: that the required withstand voltages of the primary side control circuit and the secondary side control circuit are reduced; that power consumption is reduced; and that the power efficiencies of the primary side control circuit and the secondary side control circuit are enhanced.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switched capacitor converter circuit, which is configured to operably convert a first power supply voltage to a second power supply voltage, wherein the second power supply voltage is provided to a power converter circuit; the switched capacitor converter circuit comprising:
    a conversion capacitor;
    an output capacitor; and
    a plurality of switches, which are configured to operably switch the coupling configurations of the conversion capacitor and the output capacitor according to a level of the first power supply voltage of the switched capacitor converter circuit, so as to generate the second power supply voltage at the output capacitor according to the first power supply voltage;
    wherein the second power supply voltage is configured to operably control the power converter circuit by providing power to the power converter circuit;
    wherein when the first power supply voltage is higher than a high threshold, the switched capacitor converter circuit controls the second power supply voltage to be lower than the first power supply voltage; and
    wherein when the first power supply voltage is lower than a low threshold, the switched capacitor converter circuit controls the second power supply voltage to be higher than the first power supply voltage;
    wherein the plurality of switches periodically switch according to a switching period to execute at least one of the following operations:
    (1) when the first power supply voltage is higher than the high threshold, during a first period of the switching period, the plurality of switches control the conversion capacitor and the output capacitor to be electrically connected in series between the first power supply voltage and a ground level, and when the first power supply voltage is higher than the high threshold, during a second period of the switching period, the plurality of switches control the conversion capacitor and the output capacitor to be electrically connected in parallel to each other, thereby generating the second power supply voltage at the output capacitor, so that the second power supply voltage is controlled to be ½-fold of the first power supply voltage; and/or
    (2) when the first power supply voltage is lower than the low threshold, during the first period of the switching period, the plurality of switches control the conversion capacitor to be electrically connected in series to the first power supply voltage, so that the conversion capacitor is charged, and when the first power supply voltage is lower than the low threshold, during the second period of the switching period, the plurality of switches control the conversion capacitor and the output capacitor to be electrically connected in series to each other between the first power supply voltage and the ground level, wherein a voltage across the conversion capacitor is in reversed-phase with a voltage across the output capacitor, thereby generating the second power supply voltage at the output capacitor, so that the second power supply voltage is controlled to be 2-fold of the level of the first power supply voltage;
    wherein the switched capacitor converter circuit includes: a first switch, a second switch, a third switch, a fourth switch and a fifth switch, wherein the first to four switches are coupled sequentially in series between the first power supply voltage and the ground level, wherein the first switch and the second switch are coupled to a first node; the second switch and the third switch are coupled to a second node; the third switch and the fourth switch are coupled to a third node, wherein the fifth switch is coupled between the first power supply voltage and the third node, wherein the second node is coupled to the second power supply voltage;
    wherein the conversion capacitor is coupled between the first node and the third node, whereas, the output capacitor is coupled between the second power supply voltage and the ground level.

2. The switched capacitor converter circuit of claim 1, wherein when the first power supply voltage is lower than the high threshold and higher than the low threshold, the switched capacitor converter circuit controls the second power supply voltage to be equal to the first power supply voltage.

3. The switched capacitor converter circuit of claim 1, wherein the power converter circuit is a flyback power converter.

4. The switched capacitor converter circuit of claim 3, wherein the second power supply voltage is provided to a controller of the flyback power converter.

5. The switched capacitor converter circuit of claim 3, wherein the first power supply voltage is coupled to a winding of a transformer of the flyback power converter.

6. The switched capacitor converter circuit of claim 5, wherein the first power supply voltage is proportional to an output voltage of the flyback power converter.

7. The switched capacitor converter circuit of claim 4, wherein the second power supply voltage is lower than an absolute maximum rating of the controller, and wherein the absolute maximum rating is smaller than a maximum level of the first power supply voltage.

8. The switched capacitor converter circuit of claim 1, wherein when the first power supply voltage is higher than the high threshold, the second power supply voltage is controlled to be ½-fold of the first power supply voltage.

9. The switched capacitor converter circuit of claim 8, wherein the high threshold is greater than or equal to 2-fold of a minimum operation voltage of a controller of the power converter circuit.

10. The switched capacitor converter circuit of claim 1, wherein when the first power supply voltage is lower than the low threshold, the second power supply voltage is controlled to be 2-fold of the first power supply voltage.

11. The switched capacitor converter circuit of claim 10, wherein the low threshold is greater than or equal to a minimum operation voltage of a controller of the power converter circuit.

12. The switched capacitor converter circuit of claim 1, wherein a dead time is provided between the first period of the switching period and the second period of the switching period, so as to prevent a part of the plurality of switches from being ON at the same time, thereby preventing a short circuit current from occurring.

13. The switched capacitor converter circuit of claim 1, wherein when the first power supply voltage is lower than the high threshold and higher than the low threshold, the first switch and the second switch are ON and/or the third switch and the fifth switch are ON, thereby controlling the first power supply voltage and the second power supply voltage to be electrically connected to each other, so that the second power supply voltage is equal to the first power supply voltage.

14. The switched capacitor converter circuit of claim 1, wherein each of the first switch and the second switch includes:
a first transistor and a second transistor, which are connected in series to each other, wherein a body diode of the first transistor and a body diode of the second transistor are reversely coupled to each other.

15. A flyback power converter, comprising:
a controller, which is configured to operably control a first winding of a transformer, so as to convert an input voltage to an output voltage at a second winding of the transformer; and
a switched capacitor converter circuit, which is configured to operably convert a first power supply voltage to a second power supply voltage, wherein the second power supply voltage is provided to the controller, wherein the first power supply voltage is coupled to the first winding of the transformer of the transformer; wherein the switched capacitor converter circuit includes:
a conversion capacitor;
an output capacitor; and
a plurality of switches, which are configured to operably switch the coupling configurations of the conversion capacitor and the output capacitor according to a level of the first power supply voltage of the switched capacitor converter circuit, so as to generate the second power supply voltage at the output capacitor according to the first power supply voltage;
wherein the second power supply voltage is configured to operably control the power converter circuit by providing power to the power converter circuit;
wherein when the first power supply voltage is higher than a high threshold, the switched capacitor converter circuit controls the second power supply voltage to be lower than the first power supply voltage; and
wherein when the first power supply voltage is lower than a low threshold, the switched capacitor converter circuit controls the second power supply voltage to be higher than the first power supply voltage;
wherein the plurality of switches periodically switch according to a switching period to execute at least one of the following operations:
(1) when the first power supply voltage is higher than the high threshold, during a first period of the switching period, the plurality of switches control the conversion capacitor and the output capacitor to be electrically connected in series between the first power supply voltage and a ground level, and when the first power supply voltage is higher than the high threshold, during a second period of the switching period, the plurality of switches control the conversion capacitor and the output capacitor to be electrically connected in parallel to each other, thereby generating the second power supply voltage at the output capacitor, so that the second power supply voltage is controlled to be ½-fold of the first power supply voltage; and/or
(2) when the first power supply voltage is lower than the low threshold, during the first period of the switching period, the plurality of switches control the conversion capacitor to be electrically connected in series to the first power supply voltage, so that the conversion capacitor is charged, and when the first power supply voltage is lower than the low threshold, during the second period of the switching period, the plurality of switches control the conversion capacitor and the output capacitor to be electrically connected in series to each other between the first power supply voltage and the ground level, wherein a voltage across the conversion capacitor is in reversed-phase with a voltage across the output capacitor, thereby generating the second power supply voltage at the output capacitor, so that the second power supply voltage is controlled to be 2-fold of the level of the first power supply voltage;
wherein the switched capacitor converter circuit includes:
a first switch, a second switch, a third switch, a fourth switch and a fifth switch, wherein the first to four switches are coupled sequentially in series between the first power supply voltage and the ground level, wherein the first switch and the second switch are coupled to a first node; the second switch and the third switch are coupled to a second node; the third switch and the fourth switch are coupled to a third node, wherein the fifth switch is coupled between the first power supply voltage and the third node, wherein the second node is coupled to the second power supply voltage;
wherein the conversion capacitor is coupled between the first node and the third node, whereas, the output capacitor is coupled between the second power supply voltage and the ground level.

16. The flyback power converter of claim 15, wherein when the first power supply voltage is lower than the high threshold and higher than the low threshold, the switched capacitor converter circuit controls the second power supply voltage to be equal to the first power supply voltage.

17. The flyback power converter of claim 15, wherein the first power supply voltage is proportional to an output voltage of the flyback power converter.

18. The flyback power converter of claim 15, wherein the second power supply voltage is lower than an absolute maximum rating of the controller, and wherein the absolute maximum rating is smaller than a maximum level of the first power supply voltage.

19. The flyback power converter of claim 15, wherein when the first power supply voltage is higher than the high threshold, the second power supply voltage is controlled to be ½-fold of the first power supply voltage.

20. The flyback power converter of claim 15, wherein the high threshold is greater than or equal to 2-fold of a minimum operation voltage of the controller.

21. The flyback power converter of claim 15, wherein when the first power supply voltage is lower than the low threshold, the second power supply voltage is controlled to be 2-fold of the first power supply voltage.

22. The flyback power converter of claim 15, wherein the low threshold is greater than or equal to a minimum operation voltage of the controller.

23. The flyback power converter of claim 15, wherein when the first power supply voltage is lower than the high threshold and higher than the low threshold, the first switch and the second switch are ON and/or the third switch and the fifth switch are ON, thereby controlling the first power supply voltage and the second power supply voltage to be electrically connected to each other, so that the second power supply voltage is equal to the first power supply voltage.

* * * * *